3,067,058
PROTECTIVE COATING ON A SUBSTRATE
Simon R. Gordon, Minneapolis, Minn., assignor to Gordon Building Materials, Inc., Minneapolis, Minn., a corporation of Minnesota
No Drawing. Filed June 9, 1958, Ser. No. 740,536
4 Claims. (Cl. 117—70)

This is a continuation-in-part of my pending application for Method for Waterproofing Porous Surfaces, Serial No. 639,238, and of my pending application for Protective and Decorative Coating, Serial No. 672,880, both now abandoned.

This invention has relation to an improved cement-water paint for use as a prime or intermediate coat between the substrate to be painted and a finish coat of paint; and to the protective coating which results when said intermediate coat is applied to the substrate and said finish coat is applied on top of the intermediate coat.

The improved prime or intermediate coat includes the addition of polyvinyl alcohol to a cement-water paint. Such a primer has the property of substantially preventing or reducing the loss of water from the liquid paint when it is first applied over porous surfaces so that the intermediate coat can be applied to such surfaces without the necessity for pre-wetting the surface. It also has the property of adhering very readily to glazed surfaces, and of forming a heterogeneous mixture with whatever protrusions, pores, and voids exist in a substrate of non-glazed composition, and with any particles of dust or old paint or the like which are present up to the substrate.

When a cement-water paint finish coat is applied over the substrate and over the intermediate primer of the invention, the intermediate primer has the property of forming a homogeneous mixture with the finish coat thus bonding the adjacent surfaces of the finish coat and the intermediate coating together. When a finish coat of non-cement composition is applied over the intermediate coating of the invention, this intermediate coating will form a heterogeneous mixture between the surfaces of the finished coat and that of the intermediate coat which are in contact with each other.

The property of the primer of the present invention which allows it to be applied to a porous wall, for example one of cement building blocks, without the loss of significant quantities of water into the porous surface due to the suction of capillary action is apparently due to the polyvinyl alcohol in the solution filling these capillaries, pores, or other voids and forming a shield against the further passage of water. Apparently the intermediate coat of the present invention, after it has dried, and before a finish coat is applied, is water repellent only in one direction. That is to say, tests have indicated that since polyvinyl alcohol is soluble in water and in paint vehicles, water or a paint vehicle applied to the outer surface of the intermediate coating of the invention will cause the polyvinyl alcohol to go back into solution. In this form, it can be washed or leached from the substrate on which it is painted by application of excess quantities of the water or other vehicle solvents. On the other hand, addition of water to the intermediate coating from the under side, for example by seepage through a cement building block, causes the polyvinyl alcohol immediately adjacent the substrate to tend to soften and go back into solution, thus to cause these molecules to expand and again block the pores through which the water is attempting to travel, and thereby to seal the surface of the intermediate coating spaced from the substrate from this seepage water.

Inasmuch as the water in a finish coat of cement-water paint will cause the outer surface of the intermediate coating to tend to soften and go back into solution, it is apparent that there will be an intermingling of the constituents of the finish coat and the intermediate coat at the adjacent surfaces of each.

Likewise, when a paint of linseed oil or lacquer type is applied over the intermediate coat of the present invention, the polyvinyl alcohol tends to soften and go into solution, and this also permits and causes a mutual interbonding of the adjacent surfaces of the intermediate coating and of the paint body of the finished coat.

For preparation of an intermediate coating of the present invention, any suitable polyvinyl alcohol may be used. The grade designated as PA–5 by Colton Chemical Company has been found to be very effective, but other grades may be used. In practice, the polyvinyl alcohol in the form of a dry powder is added to the dry constituents. Dry polyvinyl alcohol within about the range of from 5/8 of a pound to 1⅛ pounds to a total of 12 pounds dry constituents will prove most effective, although satisfactory results were obtained within the limits of ½ pound to 1½ pounds of polyvinyl alcohol for a total of 12 pounds of dry constituents.

An illustration of an intermediate coating giving optimum results includes the following proportion of parts by weight:

39 parts Atlas "Dura-Plastic," air-entraining cement
3 parts lime (U.S. Gypsum, "Red Top," hydrated)
4 parts polyvinyl alcohol (Colton Chemical Company No. PA–5)
1 part sodium chloride
1 part zinc sulfate These dry constituents are thoroughly mixed together, and six pounds of this mixture may be placed in a one gallon container with enough water added to make one gallon of paint. The paint is stirred until it is smooth. It can be applied immediately, although an aging of 15 to 20 minutes will improve the consistency. The coating is then ready to be applied to the substrate to be painted through the instrumentality of a nylon or hair brush.

The intermediate coating is allowed to dry on the substrate, and when dry, it will be opaque, flat, and non-rubbing. Since the polyvinyl alcohol is soluble in water, the intermediate coating must be itself protected by an insoluble paint with good weathering characteristics. For this purpose, any cement-water, oil-based or other permanent paint containing an ingredient which will at least partially dissolve the polyvinyl alcohol may be employed.

Upon application of this finish coat to the dry intermediate coating, the polyvinyl alcohol of the intermediate coating which comes in contact with the finish coat will soften and tend to go in to solution with the solvent in the finish coat, and consequently would become mutually interbonded with the paint body of the finish coat. Upon the solidification of the finish coat, whether by setting up and drying of the cement in the case of a cement-water finish paint, or by oxidation or evaporation of the vehicle in the case of other paints, the adjacent surfaces of the finish and intermediate coating will become permanently interbonded to each other. This intermediate coating is already permanently bonded to the substrate by reason of the adhesive qualities of polyvinyl alcohol, or by reason of the penetration of the polyvinyl alcohol into the pores of the substrate, or, more likely, by both actions. Because of this mutual interbonding of the intermediate coating with both the substrate and the finish coat, the properties of the finish coat are substantially and unexpectedly improved over the properties of the sum of the two coatings taken separately. For example, while the finish coating may be insoluble, it is not necessary that it be waterproof, and in the case of a cement-water paint finish coat without special ingredients added, it will not be waterproof. As previously pointed out, the intermediate coating is not waterproof either because the polyvinyl alcohol always tends to go back into solution. When one coat is painted on top of the other, however, the water penetrating the finish coat cannot penetrate the intermediate coating, and the presence of the finish coat over the intermediate coating prevents the polyvinyl alcohol molecules from being washed or leached out of the intermediate coating, so that the result of the use of the two non-waterproof coatings is a resultant coating which is waterproof.

Also, because of the mutual interbonding between layers, the resistance of the finish coating to peeling action due to extreme changes in temperature is very substantially enhanced. That is to say, the protective coating which is constituted as the intermediate and finish coating one on the other, resists much higher temperatures than could the finish coating painted directly on the substrate, and likewise, resists extremely cold temperatures much better without exhibiting peeling characteristics. For example, the interbonded finish and intermediate coating of the present invention, when applied over the metal of a display sign will not peel from the sign due to the action of the weather and extremely cold temperatures on it.

It is to be noted that, because of the water-blocking characteristics of the intermediate coating, it is not necessary to pre-wet a porous substrate either when the intermediate coating is applied, or later when the finish coating is applied over the intermediate coating. In the case of the application of the finish coating over the intermediate coating, this is because the solvent in the finish coating causes the polyvinyl alcohol to tend to soften and go back into solution and hence to block penetration of water from the finish liquid coating through the intermediate coating. This water is, therefore, available to allow the finish coating to cure in a satisfactory manner.

While the coating comprising polyvinyl alcohol and Portland cement has been described throughout as an intermediate coating, it is to be understood that it would be and is perfectly satisfactory as a one coat protection to surfaces where the only moisture would come from the side of the coating adjacent the substrate. For example, in situations where an interior wall of cement block construction is built below the ground, and the only moisture would be that which would tend to seep through the block from outside thereof, this coating will be effective to prevent the passage of moisture.

While it is not essential in all situations, the presence of sodium chloride in the "intermediate" coating when it is applied will improve the ability of this coating to adhere to the substrate and to bond into the finish coating, especially when applied to glazed or relatively dense substrates.

What is claimed is:

1. A protective coating over a substrate comprising a first paint coating bonded to said substrate, and a second coating bonded to said first coating, said first coating comprising Portland cement, polyvinyl alcohol, and sodium chloride, and said second coating including when in its liquid state a suitable paint vehicle which is a solvent for polyvinyl alcohol and comprising in its dry state a water-insoluble paint body.

2. The protective coating over a substrate of claim 1 in which said first coating includes also lime and zinc sulfate.

3. The combination with a substrate and a finish coat of paint, of: an intermediate paint coating between said substrate and said finish coat, said intermediate coating comprising approximately the following proportion of parts by weight: 39 parts of Portland cement, 3 parts of lime, 4 parts of polyvinyl alcohol, 1 part of sodium chloride, and 1 part zinc sulfate.

4. A protective coating over a substrate comprising a first paint coating bonded to said substrate, and a second coating bonded to said first coating, said first coating comprising approximately the following proportion of parts by weight: 39 parts Portland cement, 3 parts of lime, 4 parts of polyvinyl alcohol, 1 part of sodium chloride and 1 part of zinc sulfate, and said second coating including when in its liquid state a solvent for polyvinyl alcohol and comprising in its dry state an insoluble paint body.

References Cited in the file of this patent

UNITED STATES PATENTS

| 1,998,667 | Fritz | Apr. 23, 1935 |
| 2,115,612 | Carruthers | Apr. 26, 1938 |
| 2,307,696 | Carruthers | Jan. 5, 1943 |
| 2,576,955 | Ludwig | Dec. 4, 1951 |
| 2,648,645 | Boris et al. | Aug. 11, 1953 |
| 2,733,995 | Robinson | Feb. 7, 1956 |
| 2,760,885 | Larsen | Aug. 28, 1956 |
| 2,798,822 | Carter | July 9, 1957 |
| 2,803,555 | Clark et al. | Aug. 20, 1957 |

FOREIGN PATENTS

| 310,696 | Great Britain | May 2, 1929 |
| 388,463 | Great Britain | Mar. 2, 1933 |
| 414,038 | Great Britain | July 19, 1934 |
| 1,062,148 | France | Dec. 2, 1953 |